United States Patent [19]
Martin

[11] 3,753,224
[45] Aug. 14, 1973

[54] LAMP FAILURE WARNING SYSTEM FOR ROAD VEHICLES

[75] Inventor: Rex Martin, Blackburn, England

[73] Assignee: Joseph Lucas (Industries) Limited, Birmingham, England

[22] Filed: Apr. 21, 1971

[21] Appl. No.: 135,889

[30] Foreign Application Priority Data
May 2, 1970 Great Britain.................. 21,208/70

[52] U.S. Cl..................... 340/80, 340/71, 340/251
[51] Int. Cl............................................. B60q 1/44
[58] Field of Search ................. 340/52, 60, 66, 67, 340/71, 72, 79, 80, 251, 252

[56] References Cited
UNITED STATES PATENTS

| | | | |
|---|---|---|---|
| 1,726,994 | 9/1929 | Murray | 340/251 X |
| 2,257,856 | 10/1941 | Rady | 340/251 X |
| 2,486,599 | 11/1949 | Hollins | 340/80 UX |
| 2,764,752 | 9/1956 | Hollins | 340/252 |
| 3,629,799 | 12/1971 | Birtwistle | 340/52 R |

Primary Examiner—John W. Caldwell
Assistant Examiner—Kenneth N. Leimer
Attorney—Holman & Stern

[57] ABSTRACT

A lamp failure warning system for a road vehicle includes a pair of lamps the failure of which is to be monitored, and a switch for energising the lamps. Current sensing means is provided in series with the lamps for detecting failure of one lamp or the other, and when the switch is off current is passed through both lamps without illuminating them, and a warning is given if both lamps have failed.

3 Claims, 1 Drawing Figure

Patented Aug. 14, 1973
3,753,224
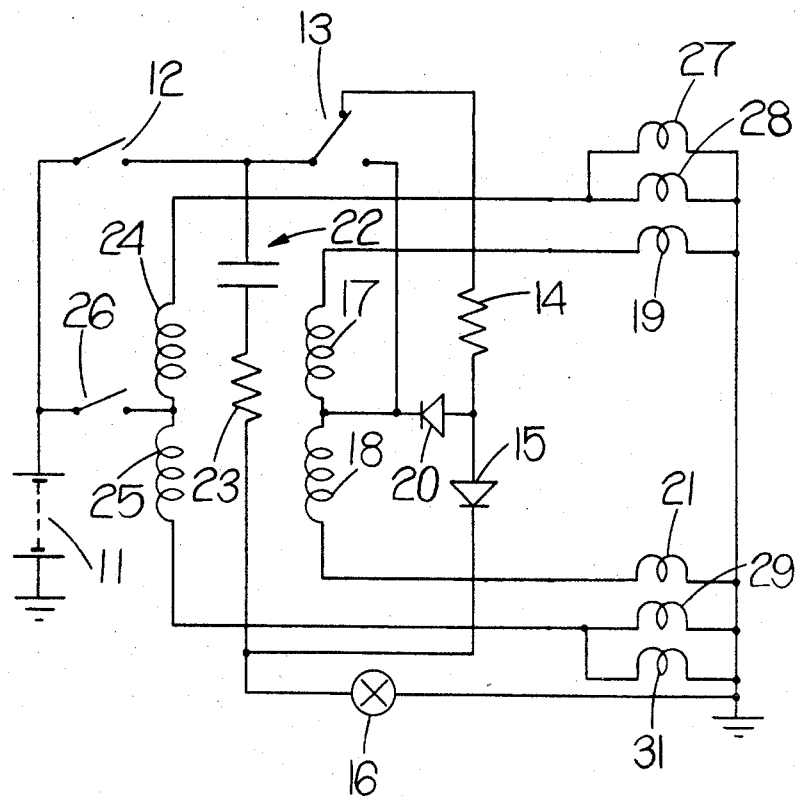
INVENTOR
Rex Martin

LAMP FAILURE WARNING SYSTEM FOR ROAD VEHICLES

This invention relates to lamp failure warning systems for road vehicles.

A system according to the invention includes a pair of lamps the failure of which is to be monitored, a switch movable from a first position to a second position to energise the lamps, current sensing means in series with the lamps for detecting failure of one lamp or the other and operating a warning device, and means operable when said switch is in its first position for passing current through both lamps without illuminating them, and giving a warning if both lamps have failed.

Preferably, the warning is given by energising the same warning lamp that is operated with the switch in its second position when one lamp fails. In this case, diodes are provided for isolating the two testing circuits from one another.

The accompanying drawing is a circuit diagram illustrating one example of the invention.

Referring to the drawing, a vehicle battery 11 has its negative terminal earthed, and its positive terminal connected through the vehicle ignition switch 12 to the movable contact of a stop lamp switch 13 on the vehicle. The stop lamp switch 13 when in what is normally its off position, completes a circuit by way of a resistor 14 and a diode 15 to one side of a warning lamp 16, the other side of which is earthed. When the switch 13 is moved to its on position, it connects the positive battery terminal by way of the switch 12 to a point intermediate a pair of windings 17,18, the other ends of which are connected to earth through the vehicle stop lamps 19,21 respectively. The junction of the windings 17 and 18 is further connected to the junction of the resistor 14 and diode 15 through a diode 20. The windings 17 and 18 control a pair of contacts 22 which when closed complete a circuit from the junction of the switches 12 and 13 through a resistor 23 and the lamp 16 to earth. The contacts 22 are closed by magnetic unbalance between the windings 17 and 18, but also by magnetic unbalance between a pair of windings 24 and 25, the junction of which is connected to the positive battery terminal through a switch 26 controlling the side and tail lamps of the vehicle. The other end of the winding 24 is connected to earth through the side and tail lamps 27, 28 on one side of the vehicle, whilst the other end of the winding 25 is connected to earth through the side and tail lamps 29,31 on the other side of the vehicle.

The warning lamp 16 is designed to operate at one half of the battery voltage, and the resistors 14 and 23 ensure that the correct voltage is applied to the lamp 16. Assuming for the moment that the switch 26 is opened and the switch 12 is closed with the switch 13 in the position shown, current flows through the resistor 14, and then through the diode 20 and the windings 17 and 18 to the lamps 19 and 21. Assuming both these lamps are operating satisfactorily, then current flowing through the diode 15 is insufficient to illuminate the lamp 16, or alternatively illuminates the lamp 16 at very low intensity, depending on the wishes of the circuit designer. However, if both lamps 19 and 21 fail, then no circuit is completed by way of the diode 20, and all the current flowing through the resistor 14 flows through the diode 15 to energise the lamp 16 which is illuminated to warn the driver that the lamps 19 and 21 have both failed. If one only of the lamps 19 and 21 has failed, there will be an increased current flow through the lamp 16, but it will still not be illuminated very brightly.

When the switch 13 is moved to its closed position, no current flows through the resistor 14, and the lamps 19 and 21 are energised by way of the windings 17 and 18 respectively. As long as both lamps 19 and 21 are operating satisfactorily, the contacts 22 are open, but if one of the lamps 19,21 fails, then the resultant magnetic unbalance between the windings 17 and 18 causes the contacts 22 to close, completing a circuit to the lamp 16 by way of the ignition switch 12.

When the switch 26 is closed, the lamps 27,28 and 29,31 are illuminated by way of the windings 24 and 25 respectively. Failure of any one of the lamps 27,28,29,31 results in a magnetic unbalance between the windings 24 and 25, again causing the contacts 22 to close to illuminate the lamp 16. It will be appreciated that various degrees of illumination of the lamp 16 are obtained when various combinations of lamps fail, but the most important feature is that with the switch 13 in its normal position as shown in the drawing, a warning is given if both lamps 19 and 21 have failed.

Having thus described my invention what I claim as new and desire to secure by Letters Patent is:

1. A lamp failure warning system for a road vehicle including
   a source of potential;
   a first winding having first and second magnetically opposing coils, one end of each coil being connected to a common point;
   first and second lamps the failure of which is being monitored, said lamps being connected to the respective other ends of the first and second coils;
   a switch having first and second positions, said second position connecting the source of potential to the common point of the first winding to energize and light the first and second lamps;
   switching means responsive to magnetic unbalance between the first and second coils due to failure of one of the lamps;
   a warning light connected through the switching means to the source of potential, said warning light being energized when the switching means is activated due to said magnetic unbalance;
   said switch in the first position connecting said source of potential through a resistance and a first and a second unidirectional means respectively to said common point and said warning light;
   said warning light having a higher resistance than the first and second lamps whereby when the switch is in the first position current passes through the resistance and the first unidirectional means without illuminating the lamps, but if both lamps have failed, then current passes through the second unidirectional means to energize the warning light.

2. The lamp failure warning system of claim 1 wherein the first and second unidirectional means are diodes.

3. The lamp failure warning system of claim 2 further including
   a second winding having third and fourth magnetically opposing coils, one end of each coil being connected to a common point;

a pair of lamps connected to the other end of the third coil;

another pair of lamps connected to the other end of the fourth coil;

said switching means being responsive to magnetic unbalance between the third and fourth coils due to failure of any of the pairs of lamps; and a switch to apply potential to the common point of the second winding to energize and light the pairs of lamps, and whereby failure of any of the lamps upsets the magnetic balance between the third and fourth coils to activate the switching means and apply potential to the warning light.

* * * * *